April 10, 1962 S. G. ESKIN 3,029,026
GAS WATER HEATER VALVE CONSTRUCTION
Filed Nov. 24, 1959
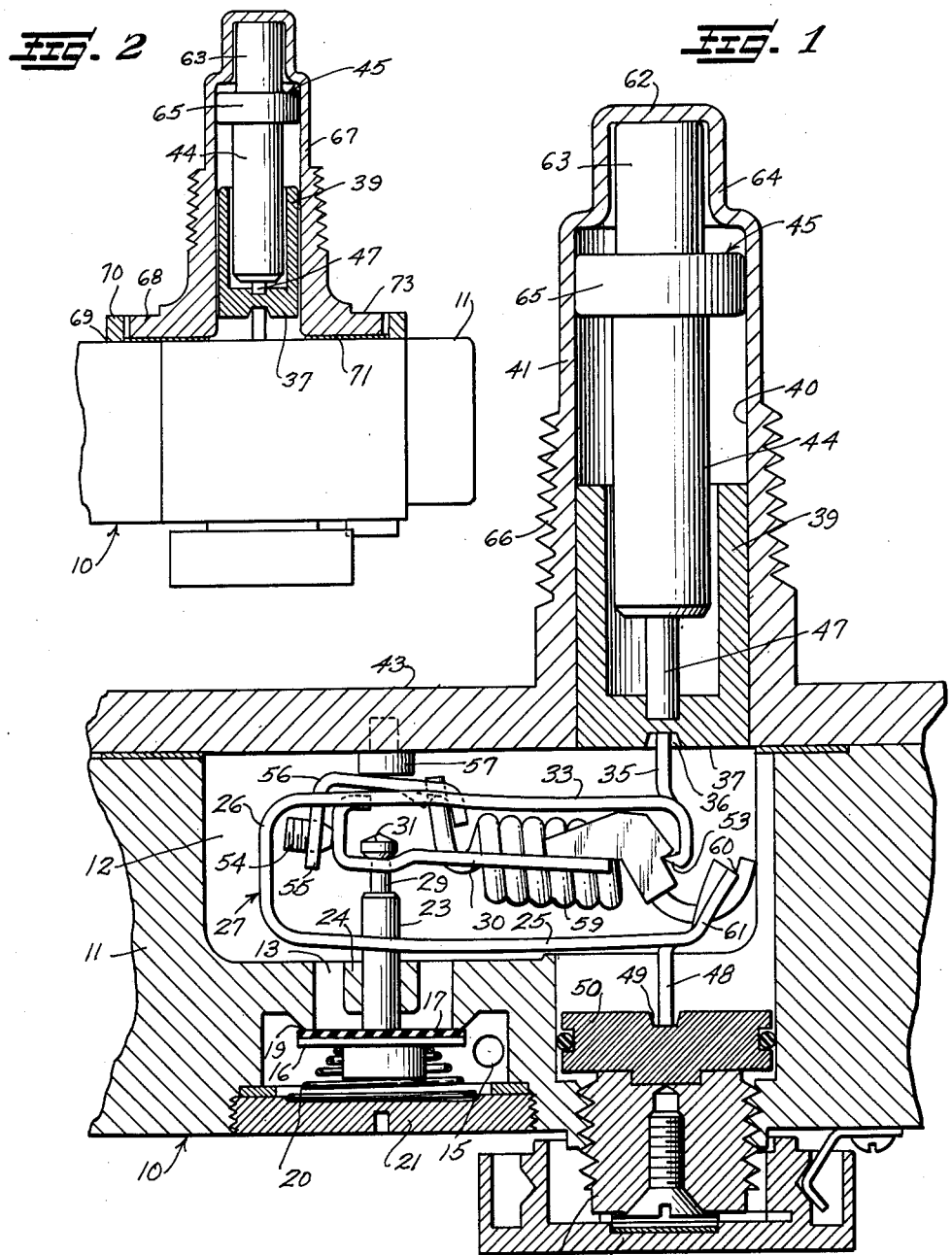
Inventor
Samuel G. Eskin

United States Patent Office 3,029,026
Patented Apr. 10, 1962

3,029,026
GAS WATER HEATER VALVE CONSTRUCTION
Samuel G. Eskin, Chicago, Ill., assignor to The Dole Valve Company, Morton Grove, Ill., a corporation of Illinois
Filed Nov. 24, 1959, Ser. No. 855,118
2 Claims. (Cl. 236—32)

This invention relates to improvements in thermostats and more particularly relates to an improved form of thermostat in which the thermal sensitive element of the thermostat is adapted to be immersed into water in a hot water tank or container.

Hot water heater thermostatic controls are frequently actuated and controlled by rod and tube types of thermally sensitive elements which are immersed in the hot water in the hot water heater tank. With such thermostats and any thermostat in which the thermally sensitive element must be immersed in the water in the hot water tank, provision must be made to prevent the leakage of water from the tank along the thermally sensitive element into the body of the control.

One common manner in which this has been attained is to provide an air gap between the portion of the valve threaded into the hot water tank, and the body of the valve, and to seal the body of the valve by a stainless steel diaphragm, upon which the rod, of the rod and tube thermally sensitive element, acts in accordance with temperature variations. The air gap lets any water leaking into the tube drip onto the floor rather than into the control body.

Another way in which this has been attained is to provide a solder seal between the tube of the rod and tube type of thermally sensitive element, and the body of the control, to assure a positive seal between the thermally sensitive element and the body of the control.

While the foregoing methods of retaining water from entering the valve casing and mixing with the gas in the casing meet American Gas Association requirements, they have not been entirely satisfactory due to the high cost of the seal and the objectionable feature of hot water leaking onto the floor. These methods also are not readily adaptable to other types of thermally sensitive elements, such as wax or power types of thermally sensitive elements in which the casing of the element is made from a copper alloy for the heat conducting properties thereof, and cannot readily be threaded, and which also has resulted in a galvanic action, due to the presence of copper in the alloy.

A principal object of the present invention is to overcome the foregoing difficulties and provide a simple and inexpensive method for accommodating a thermally sensitive element for a gas hot water heater thermostat to be immersed in the water in the hot water tank, and to positively prevent the water in the tank from leaking into the body of the valve.

A still further object of the invention is to provide a simple form of immersion thermostat, utilizing a wax or power type of thermally sensitive element, in which the thermally sensitive element is contained within a container immersed in the water in the hot water tank, which completely encases the thermally sensitive element and prevents leakage of the water about the thermally sensitive element.

Another object of the invention is to provide an immersion type of thermostat for gas hot water heaters and the like, utilizing a wax or power type of thermally sensitive element in which the thermally sensitive element is positioned within the water in the hot water tank without the usual threading or sealing, by mounting the thermally sensitive element in a container immersible in a hot water tank in heat conducting relation with respect to the container.

These and other objects of the invention will appear from time to time as the following specification proceeds and with reference to the accompanying drawing wherein:

FIGURE 1 is a fragmentary sectional view taken through a gas hot water heater thermostatic valve constructed in accordance with the invention, showing the thermally responsive element sealed from direct contact with the water in the hot water tank, and showing the drive connection from the thermally responsive element to the thermostatic valve; and FIGURE 2 is a view in side elevation of a thermostatic hot water heater valve constructed in accordance with the invention with certain parts shown in section in order to illustrate a modified form in which the invention may be embodied.

In the embodiment of the invention illustrated in the drawing, I have shown a thermostatic gas supply and safety shut-off valve 10 of a type particularly adapted to control the flow of gas to the main burner of a hot water heater and the like. The valve 10 is of a type similar to that shown and described in an application Serial No. 842,228, filed by Donald E. Miller on October 19, 1959, and asigned to assignee of the present application, so need not herein be shown or described in detail, except to point out that the valve includes a valve body 11 having a chamber 12 into which the gas flows from the valve inlet (not shown) under the control of the usual thermoelectric safety shut-off valve (not shown) and selector gas cock (not shown). Gas flows from the chamber 12 out to the main gas burner (not shown) through a port 13, leading from the chamber 12 and through an outlet port 15 leading from the valve body under the control of a thermostatically operated valve 16.

The thermostatically operated valve 16 is shown as being a disk valve having a resilient valve face 17 engaging a seat 19 extending about the port 13. The valve 16 is biased into engagement with the seat 19 by a conical spring 20, seated on the outer face of the valve 16 at one end and at its opposite end on the inner face of a plug 21, threaded within the valve body and sealed thereto. The valve 16 has a stem 23 guided in a wall portion 24 of the valve body within the port 13, and freely extending through a leg 25 of a generally U-shaped main spring 26, for a snap-acting mechanism 27, for opening and accommodating closing of the valve with a snap-action, as in the aforementioned application of Donald E. Miller, Serial No. 842,228.

The valve stem 23 has a reduced diameter inner end portion 29 slidably mounted on a snap link 30 of the snap-acting mechanism 27 and has a head 31 engaging the upper side of the snap link 30. The recess formed by the reduced diameter portion 29 of the valve stem 23 thus forms a lost motion connection between the snap link 30 and the valve stem 23, accommodating opening and closing of the valve 16 with a snap-action.

The main spring 27 also has an upper leg 33 having a rectangular tongue 35 extending upwardly therefrom and seated in a rectangular slot 36 formed in a closed end 37 of a hollow, generally cylindrical plunger 39, slidably guided for movement along an inner cylindrical wall 40 of a hollow boss or container 41, herein shown as extending from a cover 43 for the chamber 12, suitably secured to and sealed to the valve body 11.

The plunger 39 extends inwardly along a cylinder 44 of a thermally responsive element 45 and is extensibly moved with respect to the wall 40 of the casing 41 by a piston 47 of the thermally responsive element, as will hereinafter more clearly appear as this specification proceeds.

The lower leg 25 of the main spring 27 has a rectangular tongue 48 leading downwardly therefrom, and engaging within a rectangular slotted seat 49, formed in the inner face of an adjustment member 50, abutted by a threaded plug 52, threaded within the valve body.

A temperature adjustment knob 51 is suitably secured to the outer end of the threaded plug 52, to vary the position of the rectangular slotted seat 49 with respect to a knife edge fulcrum 53 for the snap link 30, to vary the temperature range of operation of the valve 16.

The snap link 30 has rocking engagement with the knife edge fulcrum 53 at one end, and extends along the main spring 27 and is seated at its opposite end on the conical end portion of a spring tensioner screw 54, threaded within an inwardly turned leg 55 of a spring tensioner 56. The spring tensioner 56 engages a stud 57 extending inwardly from the cover 43 and has one end of an actuating spring 59 connected thereto. The opposite end of the actuating spring 59 is connected to and pivots about a spring hinge or abutment 60 on the inner end of an upturned end portion 61 of the lower leg 25 of the main spring 27.

In FIGURE 1 of the drawings, the piston 47 of the thermally responsive element 45 is in its extended position, and the snap-acting mechanism 27 is in such a position that a very slight retraction of the piston 47 will cause the snap link 30, snap spring 59 and spring tensioner 56 to snap in position to engage the lower end of the recess formed by the reduced diameter portion 29 of the valve stem 23, and move the valve 16 to an open position with a snap-action.

Upon retractable movement of the piston 47, closing movement of the valve will begin when the force of the snap-acting mechanism 27 falls below the force of the valve spring 20. The over-center position of the snap-acting mechanism will occur when the valve 16 is partially open. The snap link 30 and the actuating spring 59 will rotate past the (over-center) position, at which time the snap link 30 will assist the valve spring 20 in closing the valve, and the valve will be closed with a snap-action.

The thermally responsive element 45 is shown as being of the so-called wax or power type of thermally responsive element, and may be of a type operating on principles, such as are shown and described in the Vernet Patent No. 2,368,181, dated January 30, 1945. In such thermally responsive elements, a fusible material, such as, a wax alone or a wax, powdered-metal heat conductor and a binder contained within a casing 63 for the thermally responsive element, reacts against a flexible membrane (not shown), upon increases in temperature of the hot water to which the casing 63 is subjected, to the fusion point of the fusible thermally expansible material, to extend the piston 47 with respect to the cylinder 44.

As herein shown, the casing 63 is contained within a reduced diameter portion 64 of the container 41 and abuts an inner end wall 62 of said container and has heat conducting relation with respect thereto. A clamping ring 65, which clamps the casing 63 to the cylinder 44, and retains the flexible membrane (not shown) in position, is relatively loosely carried within the cylindrical wall 40 of the casing 41 to accommodate ready insertion of the thermally responsive element within the casing 41. The fit between the clamping ring 65 and the cylindrical wall 40 is, however, sufficiently close to provide good heat conduction between said clamping ring and said cylindrical wall.

The container 41, as well as the cover 43, formed integrally with said casing, may be made from brass for the good heat conductive qualities of the metal, and is exteriorly threaded, as indicated by reference character 66, to accommodate the container 41 to be immersed in the water in the hot water heater tank, and provide good heat conductivity between the casing 41 and the casing 63 for the thermally responsive element 45.

It may be seen from the foregoing that the container 41 encasing the thermally responsive element 45, and threaded in the wall of the hot water heater tank, and thereby immersed in the water in the hot water heater tank provides the heat conductivity to effect efficient operation of the thermally responsive element and insures against the leakage of hot water in the hot water tank, into the body of the valve.

It may also be seen that with the construction just described, applicant is enabled to safely use a wax or power type of thermally responsive element, and to take advantage of the long stroke and power of the thermally responsive element, and the quicker and more sensitive operation thereof, in comparison with the rod and utbe types of thermally responsive elements heretofore used in hot water heater thermostatic valves.

It should further be noted that while the casing 41 is made from brass, that this casing is made from a brass commonly known as red brass, which due to its properties has only a minimum amount of erosion or other loss of material, and has sufficient strength to contain the thermally responsive element and form an abutment therefor, to accommodate efficient operation thereof.

In the modification of the invention shown in FIGURE 2, the valve, the thermally responsive element and snap-acting mechanism operated by the valve is the same as that shown in FIGURE 1. The valve and snap-acting mechanism, therefore, need not be shown or described. The same part numbers will, accordingly, by applied to the valve body, thermally expansible element and plunger, as were applied in the form of the invention illustrated in FIGURE 1.

In the modified form of the invention shown in FIGURE 2, a container 67 for the thermally responsive element 45 is shown, which is like the container 41, except that in this form of the invention, the container 67 is separate from a cover 69 for the valve body 11. As shown in FIGURE 2, the container 67 has an annular flange 68 extending within an annular rib 70 on the cover 69, and is sealed to said cover as by a suitable seal or gasket 71. The casing 67 may be sealed to the cover 69 as by cap screws or the like (not shown) extending through the flange 68 of said container.

In this form of the invention, the piston 47 of the thermally responsive element 45 is shown in a retracted position. The container 67 like the container 41 is in the wall of the tank of the hot water heater and positions the thermally responsive element 45 in heat association with the water in the hot water tank and completely closes the thermally responsive element from water in the hot water tank, and retains the valve body 11 outside of the wall of the hot water tank, precluding the leaking of water from the tank along the thermally responsive element into the valve body.

It should here be understood that while thermally responsive element is herein shown and described as operating a gas hot water heater valve, that it may operate any valve or control switch in which it is advantageous to immerse the thermally responsive element directly in a liquid being controlled.

While I have herein shown and described one form in which my invention may be mebodied, it may be understood that various modifications and variations in the invention may be attained without departing from the spirit and scope of the novel concepts thereof, as defined by the claims appended hereto.

I claim as my invention:

1. In a gas hot water heater thermostatic valve and in combination with a hot water heater tank, a valve body having a chamber therein, an outlet leading from said valve body and a port affording communication between said chamber and said outlet, a valve cooperating with said port and controlling the flow from said chamber to said outlet, a thermally responsive element including a casing containing a fusible thermally expansible material, a cylinder extending from said casing and a piston extensible from said cylinder upon increases in temperautre, an operative connection from said piston to said valve including a snap-acting mechanism forming a return spring for said piston and having a rectangular tongue having operative connection with said piston, and closure means for said valve body and chamber including a hollow boss extending from said valve body and adapted to be threaded within the wall of a hot water heater tank, said hollow boss having a closed outer end and an interior cylindrical wall having communication with said chamber and accommodating said thermally responsive element to be dropped thereinto with said casing of said thermally responsive element in abutting engagement with the closed outer end of said hollow boss, a generally cylindrical plunger slidably guided in said interior wall and having a closed inner end engaged by said piston and having a flat surface facing the inside of said chamber having a slot therein engaged by said tongue and forming an actuating member for said snap-acting mechanism for actuating said valve, said hollow boss supporting said thermally responsive element within the hot water heater tank in heat conducting relation with respect to the water in said tank and supporting said valve body on the outside of the hot water heater tank and thereby precluding the leakage of water from said tank within said valve body along said thermally responsive element.

2. A gas hot water heater thermostatic valve in accordance with claim 1, wherein the closure means forms a cover for the valve body and has the hollow boss formed integrally therewith and wherein the hollow boss and cover are made from a metal of high heat conductivity having sufficient strength to withstand the force of said thermally responsive element against the closed outer end of said hollow boss.

References Cited in the file of this patent

UNITED STATES PATENTS

| Re. 24,442 | Eskin | Mar. 11, 1958 |
| 2,286,630 | Landon et al. | June 16, 1942 |
| 2,806,654 | Daly | Sept. 17, 1957 |

FOREIGN PATENTS

| 14,211 | Great Britain | of 1904 |